US 8,358,783 B2

(12) United States Patent
Davis et al.

(10) Patent No.: US 8,358,783 B2
(45) Date of Patent: Jan. 22, 2013

(54) SECURE WIEGAND COMMUNICATIONS

(75) Inventors: Michael Davis, Amherst, NY (US); David Andresky, Lafayette, CO (US); Scott B. Guthery, Chestnut Hill, MA (US); Mark Robinton, Somerville, MA (US)

(73) Assignee: Assa Abloy AB (SE)

( * ) Notice: Subject to any disclaimer, the term of this patent is extended or adjusted under 35 U.S.C. 154(b) by 594 days.

(21) Appl. No.: 12/539,431

(22) Filed: Aug. 11, 2009

(65) Prior Publication Data

US 2010/0034375 A1 Feb. 11, 2010

Related U.S. Application Data

(60) Provisional application No. 61/087,941, filed on Aug. 11, 2008.

(51) Int. Cl.
*H04K 1/00* (2006.01)
(52) U.S. Cl. .................. 380/270; 380/260; 380/46
(58) Field of Classification Search .............. 380/260, 380/270
See application file for complete search history.

(56) References Cited

U.S. PATENT DOCUMENTS

| | | | |
|---|---|---|---|
| 3,694,757 A | 9/1972 | Hanna, Jr. |
| 3,842,350 A | 10/1974 | Gross |
| 4,087,626 A | 5/1978 | Brader |
| 4,163,215 A | 7/1979 | Iida |
| 4,333,072 A | 6/1982 | Beigel |
| 4,425,645 A | 1/1984 | Weaver et al. |
| 4,519,068 A | 5/1985 | Krebs et al. |
| 4,549,264 A | 10/1985 | Carroll et al. |
| 4,656,463 A | 4/1987 | Anders et al. |
| 4,688,026 A | 8/1987 | Scribner et al. |
| 4,849,927 A | 7/1989 | Vos |
| 5,013,898 A | 5/1991 | Glasspool |
| 5,028,918 A | 7/1991 | Giles et al. |
| 5,041,826 A | 8/1991 | Milheiser |
| 5,050,150 A | 9/1991 | Ikeda |
| 5,151,684 A | 9/1992 | Johnsen |
| 5,166,676 A | 11/1992 | Milheiser |
| 5,187,676 A | 2/1993 | DeVane |
| 5,193,115 A | 3/1993 | Vobach |
| 5,218,344 A | 6/1993 | Ricketts |
| 5,235,642 A | 8/1993 | Wobber et al. |
| 5,258,936 A | 11/1993 | Gallup et al. |
| 5,343,469 A | 8/1994 | Ohshima |
| 5,347,263 A | 9/1994 | Carroll et al. |

(Continued)

FOREIGN PATENT DOCUMENTS

AU 2006203768 3/2007

(Continued)

OTHER PUBLICATIONS

International Preliminary Report on Patentability for International (PCT) Patent Application No. PCT/US09/53430, mailed Feb. 24, 2011.

(Continued)

*Primary Examiner* — Cordelia Zecher
(74) *Attorney, Agent, or Firm* — Sheridan Ross P.C.

(57) ABSTRACT

The present invention is directed toward secure access systems. Specifically, a method and system is provided that enhances the security of unidirectional communication protocols used in access control systems, such as the Wiegand protocol. The enhancements may include obfuscation of data, a two-way packet-mode communications, and blind synchronization of pseudo-random number generators.

27 Claims, 5 Drawing Sheets

U.S. PATENT DOCUMENTS

| | | |
|---|---|---|
| 5,357,528 A | 10/1994 | Alon et al. |
| 5,396,215 A | 3/1995 | Hinkle |
| 5,420,928 A | 5/1995 | Aiello et al. |
| 5,426,425 A | 6/1995 | Conrad et al. |
| 5,446,683 A | 8/1995 | Mullen et al. |
| 5,467,082 A | 11/1995 | Sanderson |
| 5,491,471 A | 2/1996 | Stobbe |
| 5,517,172 A | 5/1996 | Chiu |
| 5,519,381 A | 5/1996 | Marsh et al. |
| 5,521,602 A | 5/1996 | Carroll et al. |
| 5,533,128 A | 7/1996 | Vobach |
| 5,541,996 A | 7/1996 | Ridenour |
| 5,577,124 A | 11/1996 | Anshel et al. |
| 5,594,384 A | 1/1997 | Carroll et al. |
| 5,600,324 A | 2/1997 | Reed et al. |
| 5,600,683 A | 2/1997 | Bierach et al. |
| 5,608,801 A | 3/1997 | Aiello et al. |
| 5,679,945 A | 10/1997 | Renner et al. |
| 5,680,131 A | 10/1997 | Utz |
| 5,686,904 A | 11/1997 | Bruwer |
| 5,696,909 A | 12/1997 | Wallner |
| 5,724,417 A | 3/1998 | Bartholomew et al. |
| 5,745,037 A | 4/1998 | Guthrie et al. |
| 5,751,808 A | 5/1998 | Anshel et al. |
| 5,754,603 A | 5/1998 | Thomas et al. |
| 5,777,561 A | 7/1998 | Chieu et al. |
| 5,802,176 A | 9/1998 | Audebert |
| 5,825,882 A | 10/1998 | Kowalski et al. |
| 5,844,990 A | 12/1998 | Kokubu et al. |
| 5,848,541 A | 12/1998 | Glick et al. |
| 5,886,894 A | 3/1999 | Rakoff |
| 5,887,176 A | 3/1999 | Griffith et al. |
| 5,909,462 A | 6/1999 | Kamerman et al. |
| 5,923,264 A | 7/1999 | Lavelle et al. |
| 5,929,779 A | 7/1999 | MacLellan et al. |
| 5,952,922 A | 9/1999 | Shober |
| 5,952,935 A | 9/1999 | Mejia et al. |
| 5,954,583 A | 9/1999 | Green |
| 5,991,410 A | 11/1999 | Albert et al. |
| 5,995,956 A | 11/1999 | Nguyen |
| 6,044,388 A | 3/2000 | DeBellis et al. |
| 6,052,786 A | 4/2000 | Tsuchida |
| 6,078,251 A | 6/2000 | Landt et al. |
| 6,078,888 A | 6/2000 | Johnson, Jr. |
| 6,079,018 A | 6/2000 | Hardy et al. |
| 6,097,307 A | 8/2000 | Utz |
| 6,154,544 A | 11/2000 | Farris et al. |
| 6,181,252 B1 | 1/2001 | Nakano |
| 6,182,214 B1 | 1/2001 | Hardjono |
| 6,192,222 B1 | 2/2001 | Greeff et al. |
| 6,212,175 B1 | 4/2001 | Harsch |
| 6,219,439 B1 | 4/2001 | Burger |
| 6,223,984 B1 | 5/2001 | Renner et al. |
| 6,249,212 B1 | 6/2001 | Beigel et al. |
| 6,249,866 B1 | 6/2001 | Brundrett et al. |
| 6,259,367 B1 | 7/2001 | Klein |
| 6,272,562 B1 | 8/2001 | Scott et al. |
| 6,285,681 B1 | 9/2001 | Kolze et al. |
| 6,285,761 B1 | 9/2001 | Patel et al. |
| 6,304,613 B1 | 10/2001 | Koller et al. |
| 6,307,517 B1 | 10/2001 | Lee |
| 6,314,440 B1 | 11/2001 | O'Toole et al. |
| 6,317,027 B1 | 11/2001 | Watkins |
| 6,325,285 B1 | 12/2001 | Baratelli |
| 6,366,967 B1 | 4/2002 | Wagner |
| 6,377,176 B1 | 4/2002 | Lee |
| 6,411,199 B1 | 6/2002 | Geiszler et al. |
| 6,420,961 B1 | 7/2002 | Bates et al. |
| 6,483,427 B1 | 11/2002 | Werb |
| 6,487,176 B1 | 11/2002 | Lehmann |
| 6,496,595 B1 | 12/2002 | Puchek et al. |
| 6,496,806 B1 | 12/2002 | Horwitz et al. |
| 6,509,828 B2 | 1/2003 | Bolavage et al. |
| 6,542,608 B2 | 4/2003 | Scheidt et al. |
| 6,606,386 B2 | 8/2003 | Scheidt et al. |
| 6,608,901 B2 | 8/2003 | Scheidt et al. |
| 6,617,962 B1 | 9/2003 | Horwitz et al. |
| 6,677,852 B1 | 1/2004 | Landt |
| 6,691,141 B2 | 2/2004 | Schmidt |
| 6,717,516 B2 | 4/2004 | Bridgelall |
| 6,718,038 B1 | 4/2004 | Cusmario |
| 6,724,296 B1 | 4/2004 | Hikita et al. |
| 6,810,123 B2 | 10/2004 | Farris et al. |
| 6,885,747 B1 | 4/2005 | Scheidt et al. |
| 6,903,656 B1 | 6/2005 | Lee |
| 6,922,558 B2 | 7/2005 | Delp et al. |
| 6,931,533 B2 | 8/2005 | Roberts |
| 6,944,768 B2 | 9/2005 | Siegel et al. |
| 6,947,560 B1 | 9/2005 | Smeets et al. |
| 6,963,270 B1 | 11/2005 | Gallagher, III et al. |
| 6,988,203 B2 | 1/2006 | Davis et al. |
| 6,992,567 B2 | 1/2006 | Cole et al. |
| 7,016,925 B2 | 3/2006 | Schmidt |
| 7,026,935 B2 | 4/2006 | Diorio et al. |
| 7,064,665 B2 | 6/2006 | Woodall et al. |
| 7,085,791 B2 | 8/2006 | Barry et al. |
| 7,118,033 B2 | 10/2006 | Merkert |
| 7,120,696 B1 | 10/2006 | Au et al. |
| 7,170,997 B2 | 1/2007 | Petersen et al. |
| 7,190,787 B1 | 3/2007 | Graunke et al. |
| 7,197,279 B2 | 3/2007 | Bellantoni |
| 7,212,632 B2 | 5/2007 | Scheidt et al. |
| 7,219,113 B2 | 5/2007 | Bonaccio et al. |
| 7,268,681 B2 | 9/2007 | Fitzgibbon |
| 7,269,416 B2 | 9/2007 | Guthrie et al. |
| 7,277,543 B1 | 10/2007 | Driscoll |
| 7,293,698 B2 | 11/2007 | Cheng et al. |
| 7,375,616 B2 | 5/2008 | Rowse et al. |
| 7,378,967 B2 | 5/2008 | Sullivan et al. |
| 7,412,056 B2 | 8/2008 | Farris et al. |
| 7,492,898 B2 | 2/2009 | Farris et al. |
| 7,492,905 B2 | 2/2009 | Fitzgibbon |
| 7,551,081 B2 | 6/2009 | Vrba et al. |
| 2001/0041593 A1 | 11/2001 | Asada |
| 2001/0056534 A1 | 12/2001 | Roberts |
| 2002/0016913 A1 | 2/2002 | Wheeler et al. |
| 2002/0036569 A1 | 3/2002 | Martin |
| 2002/0131595 A1 | 9/2002 | Veda et al. |
| 2002/0184539 A1 | 12/2002 | Fukuda et al. |
| 2003/0007473 A1 | 1/2003 | Strong et al. |
| 2003/0014646 A1 | 1/2003 | Buddhikot et al. |
| 2003/0055667 A1 | 3/2003 | Sgambaro et al. |
| 2003/0074319 A1 | 4/2003 | Jaquette |
| 2003/0081785 A1 | 5/2003 | Boneh et al. |
| 2003/0204541 A1 | 10/2003 | Shackleford et al. |
| 2003/0208697 A1 | 11/2003 | Gardner |
| 2004/0069852 A1 | 4/2004 | Seppinen et al. |
| 2004/0087273 A1 | 5/2004 | Perttila et al. |
| 2004/0089707 A1 | 5/2004 | Cortina et al. |
| 2004/0153291 A1 | 8/2004 | Kocarev et al. |
| 2004/0162863 A1 | 8/2004 | Barry et al. |
| 2004/0162864 A1 | 8/2004 | Nowshadi et al. |
| 2004/0176032 A1 | 9/2004 | Kotola et al. |
| 2004/0179684 A1 | 9/2004 | Appenzeller et al. |
| 2004/0212493 A1 | 10/2004 | Stilp |
| 2004/0232220 A1 | 11/2004 | Beenau et al. |
| 2005/0002533 A1 | 1/2005 | Langin-Hooper et al. |
| 2005/0010624 A1 | 1/2005 | Stehle |
| 2005/0010750 A1 | 1/2005 | Ward et al. |
| 2005/0036620 A1 | 2/2005 | Casden et al. |
| 2005/0044119 A1 | 2/2005 | Langin-Hooper et al. |
| 2005/0063004 A1 | 3/2005 | Silverbrook et al. |
| 2005/0110210 A1 | 5/2005 | Soltys et al. |
| 2005/0116813 A1 | 6/2005 | Raskar |
| 2005/0127172 A1 | 6/2005 | Merkert, Sr. |
| 2005/0129247 A1 | 6/2005 | Gammel et al. |
| 2005/0166040 A1 | 7/2005 | Walmsley |
| 2005/0182946 A1 | 8/2005 | Shatford |
| 2005/0265546 A1 | 12/2005 | Suzuki |
| 2006/0083228 A1 | 4/2006 | Ong et al. |
| 2006/0101274 A1 | 5/2006 | Merkert et al. |
| 2006/0123466 A1* | 6/2006 | Davis et al. .......... 726/2 |
| 2006/0156027 A1 | 7/2006 | Blake |
| 2006/0174184 A1 | 8/2006 | Stroud et al. |
| 2006/0177056 A1 | 8/2006 | Rostin et al. |
| 2006/0179094 A1 | 8/2006 | Onaya et al. |
| 2006/0181397 A1 | 8/2006 | Limbachiya |

| | | | |
|---|---|---|---|
| 2006/0206554 | A1 | 9/2006 | Lauter et al. |
| 2006/0210081 | A1* | 9/2006 | Zhu et al. ............... 380/277 |
| 2006/0255129 | A1 | 11/2006 | Griffiths |
| 2006/0288101 | A1 | 12/2006 | Mastrodonato et al. |
| 2006/0294312 | A1 | 12/2006 | Walmsley |
| 2007/0016942 | A1 | 1/2007 | Sakai et al. |
| 2007/0034691 | A1 | 2/2007 | Davis et al. |
| 2007/0043954 | A1 | 2/2007 | Fox |
| 2007/0046424 | A1* | 3/2007 | Davis et al. ............. 340/5.8 |
| 2007/0057057 | A1 | 3/2007 | Andresky et al. |
| 2007/0076864 | A1 | 4/2007 | Hwang |
| 2007/0099597 | A1 | 5/2007 | Arkko et al. |
| 2007/0109101 | A1 | 5/2007 | Colby |
| 2007/0121943 | A1 | 5/2007 | Dellow et al. |
| 2007/0165847 | A1 | 7/2007 | Langin-Hooper et al. |
| 2007/0165848 | A1 | 7/2007 | Reyes |
| 2007/0178886 | A1 | 8/2007 | Wang et al. |
| 2007/0183593 | A1 | 8/2007 | Yoshida et al. |
| 2007/0195952 | A1 | 8/2007 | Singanamala |
| 2007/0214293 | A1 | 9/2007 | Gangstoe et al. |
| 2007/0269048 | A1 | 11/2007 | Hsu |
| 2007/0273497 | A1 | 11/2007 | Kuroda et al. |
| 2007/0293192 | A9 | 12/2007 | De Groot |
| 2007/0294528 | A1 | 12/2007 | Shoji et al. |
| 2007/0294531 | A1 | 12/2007 | Alten |
| 2007/0294539 | A1 | 12/2007 | Shulman et al. |
| 2007/0296817 | A1 | 12/2007 | Ebrahimi et al. |
| 2008/0001778 | A1 | 1/2008 | Challener et al. |
| 2008/0005532 | A1 | 1/2008 | Liao et al. |
| 2008/0010218 | A1 | 1/2008 | Zank |
| 2008/0012690 | A1 | 1/2008 | Friedrich |
| 2008/0014867 | A1 | 1/2008 | Finn |
| 2008/0016363 | A1 | 1/2008 | Lapstun et al. |
| 2008/0032626 | A1 | 2/2008 | Chen |
| 2008/0037466 | A1* | 2/2008 | Ngo et al. ............... 370/329 |
| 2008/0046493 | A1 | 2/2008 | Rosenberg |
| 2008/0061941 | A1 | 3/2008 | Fischer et al. |
| 2008/0094171 | A1 | 4/2008 | Sawhney |
| 2008/0184349 | A1 | 7/2008 | Ting |
| 2008/0229400 | A1 | 9/2008 | Burke |
| 2009/0128392 | A1* | 5/2009 | Hardacker et al. ............ 341/175 |
| 2009/0315673 | A1 | 12/2009 | Huang |
| 2010/0001840 | A1 | 1/2010 | Kang et al. |

FOREIGN PATENT DOCUMENTS

| | | |
|---|---|---|
| CA | 2556843 | 2/2007 |
| CN | 1307309 | 8/2001 |
| EP | 0616429 | 9/1994 |
| EP | 0697491 | 2/1996 |
| EP | 0843438 | 5/1998 |
| EP | 0872976 | 10/1998 |
| EP | 0924894 | 6/1999 |
| EP | 0949563 | 10/1999 |
| EP | 0956818 | 11/1999 |
| EP | 0996928 | 5/2000 |
| EP | 1148644 | 10/2001 |
| EP | 1251448 | 10/2002 |
| EP | 1292882 | 3/2003 |
| EP | 1398691 | 3/2004 |
| EP | 1420542 | 5/2004 |
| EP | 1460573 | 9/2004 |
| EP | 1643643 | 4/2006 |
| EP | 1696360 | 8/2006 |
| EP | 1043687 | 11/2006 |
| EP | 1760985 | 3/2007 |
| GB | 2256170 | 12/1992 |
| GB | 2331825 | 6/1999 |
| JP | 2002-261749 | 9/2002 |
| KR | 2002-0073716 | 9/2002 |
| RU | 2158444 | 10/2000 |
| RU | 2195020 | 12/2002 |
| WO | WO 97/17683 | 5/1997 |
| WO | WO 99/56429 | 11/1999 |
| WO | WO 01/13218 | 2/2001 |
| WO | WO 01/18331 | 3/2001 |
| WO | WO 02/082367 | 10/2002 |
| WO | WO 03/027832 | 4/2003 |
| WO | WO 03/042812 | 5/2003 |
| WO | WO 2004/010373 | 1/2004 |
| WO | WO 2004/039119 | 5/2004 |
| WO | WO 2005/001777 | 1/2005 |
| WO | WO 2005/018137 | 2/2005 |
| WO | WO 2005/029315 | 3/2005 |
| WO | WO 2005/038729 | 4/2005 |
| WO | WO 2006/015625 | 2/2006 |
| WO | WO 2006/032941 | 3/2006 |
| WO | WO 2006/036521 | 4/2006 |
| WO | WO 2006/123316 | 11/2006 |
| WO | WO 2006/126668 | 11/2006 |
| WO | WO 2007/094868 | 8/2007 |
| WO | WO 2007/103906 | 9/2007 |
| WO | WO 2007/117315 | 10/2007 |
| WO | WO 2007/120215 | 10/2007 |
| WO | WO 2008/001918 | 1/2008 |
| WO | WO 2008/010441 | 1/2008 |
| WO | WO 2008/043125 | 4/2008 |

OTHER PUBLICATIONS

Anashin "Non-Archimedean Ergodoci Theory and Pseudorandom Generators," Oct. 7, 2007, 39 pages, available at http://arxiv.org/abs/0710.1418v1.

Barker, Cryptanalysis of Shift-Register Generated Stream Cipher Systems, Cryptographic Series No. 39, Aegean Park Press, 1984, Chapters 1-3, pp. 1-38.

Blum, M. et al., "How to Generate Cryptographically Strong Sequences of Pseudo-Random Bits," SIAM Journal on Computing, Nov. 1984, vol. 13, No. 4, pp. 850-864.

Koblitz, N., p-Adic Number, p-Adic Analysis and Zeta Functions, Chapter 3, Building up Ω, Springer, New York, (1977), pp. 52-74.

Kuipers, et al., Uniform Distribution of Sequences, John Wiley & Sons (1974), 400 pages (Submitted in 3 Parts).

Luby, M., Pseudorandomness and Cryptographic Applications, Princeton University Press (1996), pp. ix-55.

Partial European Search Report for European Patent Application No. 06113988, dated Jan. 10, 2007.

Written Opinion of the International Searching Authority for International (PCT) Patent Application No. PCT/US2009/053430 mailed Nov. 24, 2009.

International Search Report for International (PCT) Patent Application No. PCT/US2009/053430 mailed Nov. 24, 2009.

Examiner's First Report for Australian Patent Application No. 2006203768, mailed Nov. 20, 2009.

"Access Control Standard for the 26-Bit Wiegand Reader Interface," Security Industry Association, Oct. 17, 1996, 15 pages.

"Condoplex—The World Leader in Developing Security and Communication Solutions," retrieved from http://web.archive.org/web/20040324112641/http:||condoplexinc.com/, publication date Mar. 24, 2004, 1 page.

"Contactless Technology for Secure Physical Access: Technology and Standards Choices," Smart Card Alliance White Paper, Oct. 2002, 36 pages.

"Information Technology: Application Profile for Commercial Biometrical Physical Access Control," Project INCITS 1706-D, 2005, 16 pages.

"Technology Basics: Understanding Wiegand," HID Corporation, 2004, 5 pages.

Anashin, V. "Uniformly distributed sequences over p-adic integers," Number Theoretic and Algebraic Methods in Computer Science, Moscow 1993 (A.J. van der Poorten, I.Shparlinski, and H.G. Zimmer eds., 1995), pp. 1-18, available at http://crypto.rsuh.ru/papers/anashin-paper1.pdf.

Anashin, V., "Pseudorandom number generation by p-adic ergodic transformations" (Jan. 29, 2004), available at http://arxiv.org/abs/cs.CR/0401030.

Anashin, V., "Pseudorandom number generation by p-adic ergodic transformations: An addendum" (Feb. 26, 2004), pp. 1-9, available at http://arxiv.org/abs/cs.CR/0402060.

Anashin, V., "Uniformly distributed sequences in computer algebra, or how to constuct program generators of random numbers," J. Math. Sci., 89(4):1355-1390 (1998), available at http://crypto.rsuh.ru/papers/anashin-paper5.pdf.

Anashin, V., "Uniformly distributed sequences of p-adic integers," II. Discrete Math. Appl., 12(6):527-590 (2002), available at http://arXiv.org/abs/math.NT/0209407.

Anashin, V., "Uniformly distributed sequences of p-adic integers," Mathematical Notes, 55(2):109-133 (1994), available at http://crypto.rsuh.ru/papers/anashin-paper2.pdf.

Brian, M., "How Remote Entry Works," Howstuffworks.com, retrieved from http://auto.howstuffworks.com/remote-entry.htm, printed on May 19, 2005, copyright 2005, 8 pages.

Damgard, I., "On the Randomness of Legendre and Jacobi Sequences," Advances in Cryptology (Proceedings of Crypto '88), Lecture Notes in Computer Science (1990), pp. 163-172.

Data Sheet, "26 Bit Weigand Specifications," Essex Electronics Incorporated, Apr. 1, 1998, 1 page.

Data Sheet, "Micro RWD EM4001 'Mag swipe' Decimal Output Version," IB Technology, May 3, 2005, pp. 1-8.

Davis, M., "Reader to Panel Authentication," Cartes 2005, Paris, France, Nov. 1, 2005, 33 pages.

Glass, B., "DMCA Used in Garage Door Battle," Ziff Davis Media, retrieved from http://www.extremetech.com/print_article2/0,2533 on May 19, 2005 (Jan. 23, 2003), 1 page.

Knebelkamp et al., "Latest Generation Technology for Immobilizer Systems," Texas Instruments, retrieved from www.ti.com/tiris on May 19, 2005, 11 pages.

Levin, L., "One Way Functions and Pseudorandom Generators," Combinatorica, vol. 7(4) (1987), pp. 357-363.

Press Release, "Radio Frequency Identification (RFID) based immobilizer systems help to curb auto theft and reduce insurance costs," Texas Instruments, May 7, 1999, 2 pages.

Weinstein, L., "DMCA: Ma Bell Would Be Proud," Wired News, Jan. 20, 2003, 27 pages.

Woodcock, F., et al., "p-Adic Chaos and Random Number Generation," Experimental Mathematics, vol. 7(4), (1998), pp. 334-342.

European Search Report and Opinion for European Patent Application No. EP09807178, dated Nov. 8, 2011 6 pages.

Official Action for U.S. Appl. No. 11/464,912, mailed Jun. 2, 2010.

Official Action for U.S. Appl. No. 11/464,912, mailed Nov. 23, 2010.

Notice of Allowance for U.S. Appl. No. 11/464,912, mailed Jan. 20, 2012 5 pages.

* cited by examiner

SECURE WIEGAND COMMUNICATIONS

CROSS REFERENCE TO RELATED APPLICATIONS

This application claims the benefit of U.S. Provisional Application No. 61/087,941, filed Aug. 11, 2008, the entire disclosure of which is hereby incorporated herein by reference.

FIELD OF THE INVENTION

The present invention is generally directed to authentication of a reader and the security, privacy and efficiency of messaging in a secure access control system. More specifically, the present invention provides extensions to unidirectional security protocols, such as the Wiegand protocol.

BACKGROUND

The Wiegand protocol is the predominant method by which physical access control card readers communicate with upstream devices such as local controllers, access control panels and host computer systems. Because of the popularity and almost universal support of the Wiegand protocol in access control panels, other devices besides access control readers are also available that support the Wiegand protocol. Such devices include biometric-based devices such as fingerprint, hand-geometry, iris, facial recognition, and vein scan. Other devices that utilize the Wiegand protocol include motion sensors, thermostats and smoke detectors.

Both the electrical and logical aspects of the Wiegand communication protocol are codified in the Security Industry Association (SIA) standard AC-01 entitled "Access Control Standard Protocol for the 26-Bit Wiegand Reader Interface", the entire contents of which are incorporated herein by this reference in their entirety and will henceforth be referred to as the "SIA standard".

Subsequent to the issuing of this standard, both the electrical and logical portions of the standard have been used to transmit bit stream messages, often called formats, longer than 26 bits. 35- and 37-bit formats are found widely and the US Government's PIV standard defines some formats of up to 300 bits. The evolution of upstream devices and middleware to use these longer formats has been slow and is still taking place.

Although other methods are utilized for carrying the informational aspects of the Wiegand protocol over communication bearers such as RS-485, F/2F, and various Internet protocols such as TCP/IP and UDP, none has achieved the widespread usage that Wiegand has in the security and access control market segments This is primarily because each manufacturer utilizes their own proprietary protocols even when using standardized communication bearers such as TCP/IP.

The widespread adoption of the Wiegand protocol is due to several advantages with the primary advantages of the Wiegand protocol being that its implementation in devices is very economical and that it allows very long cable runs which, depending on the gage of the wire used, can be as long as 500 feet.

The electrical aspect of the Wiegand protocol uses five wires. Two of these wires are used to provide power to the reader. The remaining three wires are used for data communication and signaling and use the open collector electrical standard, which means that the circuit acts as either an infinite resistance or a short circuit to ground. Typically the upstream device employs a pull-up resistor, which keeps the signal at a high voltage (+5) when it is in the open circuit state. When the signal is asserted, the output is forced to 0 volts. Note that the open state (+5 volts) represents a data value of zero and the asserted state (0 volts) represents the data value of one. This is generally referred to as an "active low" configuration where the active state is the low voltage.

Two of the three data communication and signaling wires are used by the reader to transmit data to an upstream device e.g., control panel, intermediate device, routing device, lock control mechanism, computing platform, host, or the like. These two wires are referred to as DATA0 and DATA1. As the names suggest, the DATA0 signal transmits the "0" bits of the data stream to the upstream device, and the DATA1 signal transmits the "1" bits. FIG. 1 graphically illustrates the representation of a Wiegand data stream for the binary data of "01101". Each dip in the line represents a change from 5V to 0V, thus communicating a single bit of data of the entire message.

The third data communication and signaling wire is used by the upstream device to signal the reader. This wire is called LEDCTL because it is often used by the upstream device to control a light-emitting diode (LED) in the reader and provides feedback to the card holder.

SUMMARY

The SIA standard defines the timing of the signals on the DATA0 and DATA1 lines as shown in FIG. 2 and Table 1 shown below:

TABLE 1

Timing Characteristics of DATA0 and DATA1

| SYMBOL | DESCRIPTION | MIN | MAX |
|---|---|---|---|
| TPW | Pulse Width Time | 20 μs | 100 μs |
| TPI | Pulse Interval Time | 200 μs | 20 mS |

The typical timing uses a pulse width of 50 μs and a 1 ms gap between pulses. The pulse timing between gaps determines the data rate and, as longer bit streams are used, may be reduced from the 1 ms gap typically used. An effective baud rate table calculated using various values for TPW (pulse width time) and TPI (pulse interval time) is depicted in Table 1A shown below:

TABLE 1A

Effective Baud Rate

| TPI | TPW | BAUD |
|---|---|---|
| 200 μs | 50 μs | 4000.00 |
| 250 μs | 50 μs | 3333.33 |
| 1 ms | 50 μs | 952.38 |
| 2 ms | 50 μs | 487.80 |
| 5 ms | 50 μs | 198.02 |
| 10 ms | 50 μs | 99.50 |
| 20 ms | 50 μs | 49.88 |

The baud rates depicted in Table 1A represent a TPI from 200 μs to 20 ms, which is the range of allowable TPI values defined by the SIA standard. All of the baud rates in Table 1A were calculated using a TPW value of 50 μs. However, as noted above, the TPW value may range between 20 μs and 100 μs.

Since TPW and TPI are specified as a range by the SIA standard, this fact can be exploited to provide a secondary covert communication channel over the existing communication and signaling wires. If the spacing of TPI and/or width of length TPW, for example, were to vary, this variance could be tracked by the host. As an example, using a TPI of 1 ms to represent a binary zero bit and a TPI of 2 ms to represent a binary one bit, the reader could send at least as many bits of data as there are in the primary communications path by varying TPI between 1 and 2 ms. This data could simply be additional format data or, as described below, this data could be security and authentication data, or the presence of this data can be used by the upstream device to realize that is communicating with a reader capable of supporting all of the improvement described herein. Because these secondary signals conform to the SIA standard, utilizing this method would always be backwards compatible with existing legacy systems. Another use for this secondary communications channel would be to inform the host device that the reader supports the security improvement inventions contained herein. Any host capable of detecting this could use any of the Wiegand control signals as an acknowledgement The SIA standard defines signal levels on the LEDCTL line but does not set forth any method of encoding data on this line as it does for the DATA0 and DATA1 lines. Thus, implementers of the SIA standard are free to use the LEDCTL line for arbitrary communication between the upstream devices and middleware and the reader. Moreover, the SIA standard does not preclude manufacturers from including additional features on either readers or upstream devices (i.e., panels). The SIA standard defines the minimum set of features a reader or panel must provide to be in compliance. Manufacturers may have additional features so long as they do not conflict with the SIA standard.

Access control panels may connect to as many as eight readers. The hardware cost trade-offs intrinsic to the panel-to-reader ratio has caused most panel manufacturers to support just two readers in a single panel.

It is important to point out that, if a reader is controlling an exterior door to a premise and consequently mounted on the outside of the premises, the wiring from the reader to the upstream device may be accessed by unauthorized persons.

As popular as the Wiegand interface has become, it has shortcomings. One such shortcoming arises due to the use of open collector signaling makes it very easy to connect a "listening" device to the communication and signaling wires to monitor communications between a card reader and an upstream device and thereby harvest data streams that can be used to compromise the system. Once a rogue device has been connected to monitor communications between the reader and an upstream device, an attacker can note when the door has been unlocked and record the most recent data stream as one that will open the door. Then, whenever illicit entry is desired, the attacker can replay the recorded data stream causing the door to unlock. The attacker need not remove the rogue device from the communication wires to gain unauthorized entry because of the Wiegand communications open collector data interface allows both the monitoring of messages and generation of messages from the same connection.

Furthermore, an attacker can harvest more than one valid message to gain unauthorized entry using different cardholder data so that no suspicions are aroused. Unauthorized access to the Wiegand communications wires is aided by the fact that at least one reader is typically deployed on the unsecured side of a wall or door and, because of the nature of access control, may be at a location that is not under continuous observation or scrutiny. Making matters worse, many access control readers do not include any tamper detection mechanisms so that the removal of a reader to access the internal wiring or even to replace the reader with another compromised reader or illicit device is undetectable. Even when tamper detection mechanisms are included in a reader, they are often not activated utilized because the installer of the reader does not want to incur the additional costs associated with installing additional wiring from the tamper detection mechanism back to the upstream device Certain weaknesses of the existing Wiegand protocol have been publicly exploited by hackers, such as Zac Franken. Mr. Franken has developed a device (known as the Gecko) that is capable of capturing and storing communications transmitted by a reader, and transmitting the stored communication at a later time thereby allowing unauthorized access to assets secured by the reader. This type of attack is known as a man-in-the-middle store-and-forward attack. Details of this attack will be described in further detail below along with ways that embodiments of the present invention ameliorate and/or eliminate susceptibility to such attacks.

There have been some attempts to address the shortcomings of the Wiegand protocol. One example of an extension to the Wiegand protocol is described in U.S. Pat. No. 6,988,203 to Davis et al., the contents of which are hereby incorporated herein by this reference. The '203 patent describes appending additional bits to the Wiegand format. These additional bits can provide supplementary information from the reader to the upstream device as well as error detection and/or correction bits for the transmitted data. The '203 patent further describes transmitting data back to the reader from the upstream device via an LED control line.

Additionally, in PCT Application No. WO 2005/038729 to Merkert, which is herein incorporated by this reference, an access control system that includes a signal generator located between a reader and a control panel is described. The reader utilizes a dynamic timing element that ensures a replay attack cannot be used to gain unauthorized access to an asset. The reader stamps any signal sent therefrom with a time stamp indicating when the message was generated. Then the control panel reads the time stamp to ensure that the message is current and not the replaying of a previously recorded message. An attempt to harvest a signal and resubmit that signal again at a later time will result in the control panel determining the signal is invalid. To ensure channel security between system elements, encryption and/or digital signatures are used. Unfortunately, this solution requires additional hardware to support implementation thereby increasing the overall cost of the system.

In the current art and in US 2007/0046424, the entire contents of which are incorporated herein by this reference, encryption techniques are posited to obscure the data sent from the card reader to the access control panel. Each such encryption technique assumes a managed key infrastructure for its operation and proper functioning.

There are a number of disadvantages in using keyed encryption techniques to protect the data in transmission from the reader to the panel. First, creating, administering and managing a key infrastructure can be complex and costly. The additional implementation and administration costs of a key management system to accompany the physical access control system can be a disincentive for purchasing a physical access control system that uses keyed encryption techniques.

Second, the physical access control systems, of which the reader and the panel are a part of, are typically installed and managed by personnel that are not familiar with handling and protection of cryptographic keys. Thus, there is a high likelihood that the encryption keys used to protect the data in transmission would be compromised without this compromise being detected. As a result, the data protection feature of using encryption in reader-to-panel communication may be rendered ineffective and yet the overhead performance and administration costs of the feature would endure.

Third, the amount of executable computer code needed to implement encryption techniques is not insignificant. Additional memory has to be added to each reader to contain this executable code thereby increasing the cost of the reader.

Fourth, execution of the encryption computer code will take additional processing time and thereby lengthen the response time of the reader and consequently reduce the rate at which, for example, people can pass through the door protected by the reader. Furthermore, the additional processing may require the use of a more capable microprocessor in the reader thereby further increasing the costs of each reader and the overall physical access control system.

Some security issues associated with the Wiegand protocol have been addressed in U.S. patent application Ser. No. 11/464,912 to Davis et al., the entire contents of which are incorporated herein by this reference. For example, the '912 application helps upstream devices determine whether Wiegand data is being received from a valid device or is simply a replay attack. This security feature is accomplished through the use of rolling codes to obfuscate the Wiegand data. The implementation of the technique mixes some bits known only to the reader and the panel (i.e., the rolling codes) into the existing format data.

In a first aspect of the present invention, the particular rolling code that is mixed into the format data serves to identify the reader sending the data and to time-stamp the transmission. This first aspect is henceforth referred to as stamping.

In a second aspect of the present invention, the manner in which the rolling code is mixed into the format data serves to obfuscate the true values of the data contained in the message and thus hide these values from prying eyes. This second aspect is henceforth referred to as blinding. In accordance with at least one embodiment of the present invention, the rolling code is exclusive OR'd (XOR'd) with the format data to obfuscate the format data sent in the message. This obfuscation requires significantly less processing power and processing time than traditional encryption techniques such as DES or AES In accordance with at least some embodiments of the present invention, by using the rolling codes both for authentication (stamping) and privacy (blinding), a marked improvement may be obtained in a number of security aspects of the overall system with the addition of very little added system complexity or administration cost.

In accordance with at least one embodiment of the present invention, a security method and system are provided where the rolling code used to authenticate the reader is also used to shroud, obscure and otherwise obfuscate data sent from the reader to the upstream device. This inventive method offers a number of improvements over using keyed encryption techniques to protect the data. First, dual-purposing the rolling code avoids the cost of implementing an independent key infrastructure to secure the data. This helps reduce the overall cost of the system while increasing the security associated therewith.

Second, as the rolling code changes with every transmission, discovering the rolling code for a particular transmission will not enable the discovery of any other transmissions, either before or after the broken transmission, since the codes will be different for each transmission.

Thirdly, data blinding and obfuscation techniques require fewer computer instructions to implement and execute faster than keyed encryption techniques. While data blinding and obfuscation techniques may, in some cases, provide a lower level of data security than keyed cryptography techniques, they are certainly an improvement over no data protection at all and, in many instances, may be deemed appropriate relative to the value of the underlying data or facility being protected.

In accordance with still further embodiments of the present invention, two devices may be enabled to use a synchronized pseudo-random number generator (PRNG) to secure the communication between them, for example. Synchronization of the PRNG between the two devices is lost, for example, when one device suffers a power cycle (i.e., loss of power). In accordance with at least some embodiments of the present invention, the two devices can regain synchronization of the pseudo-random number sequence without opening the possibility of a replay attack on the pseudo-random number sequence. This may be accomplished by having the two devices share one or more different PRNGs. The PRNG used to secure the communication between them is used every time they communicate and may therefore be called the primary communication or "fast" PRNG. Another PRNG may only be used when the devices need to resynchronize the fast PRNG. This second PRNG may be called the secondary synchronization or "slow" PRNG. By implementing a fast and slow PRNG, the two devices that are connected to one another, for example through Wiegand wires, may be adapted to automatically synchronize and re-synchronize with each other dynamically and without user intervention.

Table 2 lists the features and benefits of the stamping aspect of embodiments of the present invention:

TABLE 2

Features and Benefits of Wiegand Stamping

| FEATURE | BENEFIT |
|---|---|
| Each message includes a time-based unique identifier by virtue of the fact that rolling codes are sequential | Access events can be reliably associated with time for accounting and forensic purposes without a secure logging facility. The system is protected against replay of previous messages |
| Each reader or group of readers can use a different sequence of unique identifiers | The unique identifier serves to authenticate the reader or reader group that sent the message |

Table 3 lists the features and benefits of the blinding aspect of embodiments of the present invention:

TABLE 3

Features and Benefits of Wiegand Blinding

| FEATURE | BENEFIT |
|---|---|
| Personal identification data (PID) in the message is obfuscated | The privacy of the system is improved since no PID is revealed |
| The blinding can carry additional information | More information can be carried from the reader to the upstream device without altering the current message size or the current message format. Authentication information is added via use of the rolling code (e.g., which is XOR'd with the card data). |

Table 4 lists how embodiments of the present invention addresses a number of attacks on physical access control systems using the Wiegand protocol.

TABLE 4

Resistance to common threats

| THREAT | PROTECTION |
|---|---|
| Rogue Reader: A rogue or non-certified reader could be substituted for the original reader. | Embodiments of the present invention are operable to detect rogue readers due to the authentication mechanisms provided by the rolling code. |
| Man-in-the-Middle (MIM) Attack: The broadcast of an exact copy of a message between a reader and an upstream device that was previously captured. 1. A person presents their card and an unauthorized MIM device inserted between the reader and the upstream device captures this message and subsequently passes it along unmodified. 2. If the host asserts the LEDCTL signal indicating that the cardholder will be granted access, then the MIM device keeps a copy of the message otherwise it is discarded. 3. Whenever illicit entry is desired, the MIM device simply replays the saved message. | Embodiments of the present invention prevent MIM attacks due to the authentication mechanism provided by the rolling code; a replay attack would contain an earlier sequenced rolling code. |
| MIM Store and Forward Attack: The broadcast of an exact copy of a Wiegand message between a reader and an upstream device that was previously captured. This type of attack is more sophisticated than the previous MIM attack scenario because it uses social engineering in an attempt to defeat the rolling code protection. 1. A person presents their card and an unauthorized MIM device inserted between the reader and the upstream device captures this message and blocks its transmission to the upstream device 2. The user presents their card again since the door was not unlocked the first time it was presented. 3. The MIM device releases the first Wiegand message which results in the door being unlocked yet the MIM device still retains the second message which is in proper rolling code sequence to unlock the door at a later time for a perpetrator. 4. Whenever illicit entry is desired, the MIM device simply replays the saved message. | The MIM Store and Forward attack is prevented by the periodic assertion of the LEDCTL signal which requests the next rolling code from the reader causing the retained message to be out of sequence when it is used. |
| MIM Data Substitution Attack: Another form of the man-in-the-middle attack in which the Wiegand message is altered as it transmitted from the reader to the upstream device; alteration could be, for example, altering the card number data. | Embodiments of the present invention mitigate this risk due to its obfuscation of the card number by blinding, making it extremely difficult to alter data without destroying the integrity of the rolling code. |
| MIM Spoof Attack: A specialized form of the man-in-the-middle attack in which the Wiegand messages from one reader are copied and replayed at another reader. | Embodiments of the present invention are essentially immune to this type of attacks because the rolling code will not be in sync with another reader. |

TABLE 4-continued

Resistance to common threats

| THREAT | PROTECTION |
| --- | --- |
| Passive eavesdropping/Privacy leakage: Attack in which the Wiegand messages between a reader and an upstream device can be surreptitiously observed by a third-party. | If the Wiegand wires are cut during attachment of any in-line device, this may be detected depending upon the frequency of the periodic assertion of the LEDCTL signal. However, if a device is merely "attached" to the Wiegand data lines to passively monitor the data, attachment of the device will not be detected but the data itself will remain private due to its obfuscation by blinding with the rolling code. |
| Tracking: The capture of a Wiegand message between a reader and an upstream device and optionally extracting the card number, its association with a person, and the subsequent correlation of the person's whereabouts using Wiegand messages obtained from other readers. | Embodiments of the present invention mitigate this risk due to its obfuscation of the card number by blinding since the message is essentially different even if the same person presents the same card at the same reader. |
| Targeting: The ability to perform an action based on identifying an individual from the card number obtained from the passive eavesdropping of the Wiegand messages sent from the card reader to the upstream device. | Embodiments of the present invention mitigate this risk due to its obfuscation of the card number by blinding since the message is essentially different even if the same person presents the same card at the same reader. |
| Denial of Service (DOS): An attack in which the reader is made unavailable. As it relates to the Wiegand protocol, DOS may be accomplished by cutting power to the reader, cutting or shorting the DATA0 and DATA1 signals, or connecting a rogue device that continuously sends Wiegand data to jam the channel possibly causing the host to become inoperable because it may be continuously responding to bogus Wiegand data. | Unlike the current Wiegand Protocol, the host is able to detect when the reader becomes non-responsive due to a denial of service attack in which the reader power is interrupted or the integrity of the data lines are compromised because the reader will no longer respond to the periodic assertion of the LEDCTL signal. Jamming can be detected and reported by judicious firmware in the upstream device or by converting back to a legacy Wiegand operational mode. In accordance with at least some embodiments of the present invention, all of the features of the secure Wiegand can be implemented in an intermediate device located between the reader and control panel. Thus, the intermediate device can filter against DOS attacks directed toward the host, control panel, or similar upstream devices. |
| Buffer Overflow Attack: Attack in which an unexpectedly long Wiegand message causes data to be stored beyond the boundaries of a fixed-length buffer resulting in unexpected and undesirable behavior by the upstream device. | Working with panel manufacturers can help ensure that firmware is not susceptible to this type of attack and tests for susceptibility to buffer overrun attacks could be included in any validation tools provided to test for compliance with the embodiments of the inventions contained herein. Also, updated firmware designed to detect and react to these kinds of attacks may be included in an intermediate device between the legacy reader and upstream device. Thus, the intermediate device can filter against buffer overrun attacks directed toward the host, control panel, or similar upstream devices. |

In accordance with at least one embodiment of the present invention, systems and methods are provided that allow existing physical access control systems using Wiegand wires for communication between readers and upstream system components such as control panels to be modified to also support data communication from the upstream components back to the readers This may be affected by making modifications solely to the software and firmware contained in the readers and upstream devices and thus without making any changes to existing hardware. As an immediate consequence of the application of these inventive means, methods and systems, two-way, communication may be realized between card readers and upstream devices.

More specifically, in the current art, Wiegand wires are used to carry format and reader status data read from an access control credential such as a Prox or iCLASS® card by a card reader to an upstream component of an access control system which is often an access control panel. The upstream device analyzes this data and may perform operations based on this analysis such as unlocking a door located near the reader that sent the data. As described in the SIA standard and as implemented by the physical access control industry, Wiegand wires provide only a one-way channel for the communication of digital data, namely from the card reader to the upstream device.

A number of advanced features of physical access control systems can be realized if communication in the other direction, namely from the upstream device to the card reader, can be achieved. The realization of these advanced features would be particularly attractive if the communication from the upstream device to the card reader could be achieved in the following manner:
1. without modifying or changing in any way the hardware of existing components of the system including readers and upstream devices;
2. using the physical and electrical properties of any existing Wiegand wires and still operating within the electrical characteristics of the industry standard Wiegand protocol;
3. continuing compliance with the SIA standard; and
4. maintaining complete backward compatibility with all existing system functionality.

At least some embodiments of the present invention help to achieve these desirable advantages. Elements of this particular aspect include electrical and logical digital encoding techniques that enable the transmission of digital data to card readers in access control systems from upstream devices such as control panels. This is accomplished by utilizing one or more of the Wiegand wires currently defined to carry only a high-low indicator signal with pre-defined semantics to carry packets of digital data.

The existing methods of communication on Wiegand wires as described by the SIA standard only provide for the transmission of a single high-low indicator to be sent from an upstream device to the reader, in particular on the LEDCTL wire. The meaning of this high-low signal as described by the SIA standard is the on/off control of a cardholder feedback indicator such as an LED and does not include the encoding of digital data.

Consequently, there are a number of advanced features of physical access control systems that are not implemented in systems using Wiegand wires because of the lack of a digital communication path from the upstream device to the card reader other than the high-low LEDCTL signal. For example, it is impossible for the upstream device to send the reader messages to reconfigure the reader's operating characteristics. Nor is it possible for the upstream device to reconfigure the security properties of the communication from the reader to the upstream device. And finally, without true bi-directional data communication, there is no way that a reader can receive new configuration data, keys, or firmware without human intervention such as, for example, presenting a special configuration card to the reader or removing the reader from the wall to connect to a serial communication port reserved for this purpose.

In the current art, as defined by the SIA standard, a reader need only sense a high-low level signal on the LEDCTL wire and the response of the reader to changes in this signal is defined by the SIA standard. According to the SIA standard, for readers with a single color LED, when a high signal is sensed on the LEDCTL, the reader's LED is turned off. For readers with bi-color (or tri-color) LEDs, when a high signal is sensed on the LEDCTL, the reader's LED is illuminated in red or some other color, for example. Similarly, according to this standard, when a low level is present on the LEDCTL signal, the LED in a reader with a bi-color LED will be illuminated in green and is illuminated in red for readers with a single red color LED. Although it is not defined in the standard, some manufacturers will treat oscillation of the LEDCTL signal as an indication to illuminate the reader's LED in a third color (usually yellow in readers with a tri-color LED or perceived as yellow in readers with a bi-color LED by quickly alternating the flashing of the red and green LEDs). In accordance with at least some embodiments of the present invention, additional meaning is given to both the levels and transitions of the LEDCTL signal. By programming these additional meanings into the software of the reader, packets of digital data can be sent from the upstream components including control panels back to the reader.

Additionally, the frequency with which these control signals are transmitted from the upstream device to the reader can be altered in such a way as to communicate data from the upstream device to the reader. More specifically, PSK, and FSK may be utilized for transmitting data or other types of signals and data from the upstream device to the reader. A transition in signal frequency, duty cycle, or phase, for example, may provide a certain meaning to the signal that can be interpreted by the reader. Alternatively, predetermined frequencies or amplitudes may correspond to different signals and based on the frequency, for instance, of the signal transmitted from the upstream device to the reader the reader may react differently.

If hardware modifications of the host are permitted, then amplitude and voltage levels could also be utilized on the Wiegand control signals by the upstream devices to communicate back to the reader while still using existing wiring. If the voltage levels stayed within the standards, then this method of communications would still be within the defined standards and, if compliance with the strict letter of the standards is not desired or required, then amplitudes and voltage levels outside of the standards may be utilized. Additionally, a reader and an upstream device can even operate according to the SIA standard when legacy backwards compatibility is desired but operate outside the defined electrical characteristics of the standard when these improvements are desired.

The data transmission of packets of data from an upstream device back to a reader via the Wiegand LEDCTL line or any of the other Wiegand control signal is described in the following in three aspects.
1. mode change protocol
2. data encoding
3. packet structure For each aspect, there are one or more mechanisms by which the aspect can be realized in practice.

In the SIA standard, there is no defined method for upstream devices to communicate digital data to a reader, in order to, for example, change the operating characteristics of said reader. Currently it is required that a person visit the card reader and perform various maintenance procedures (e.g., update software/firmware in the reader, change operating characteristics, change keys, etc.) in the presence of and with physical access to the card reader. In the present state of the art, these maintenance procedures may include entering updated data into the reader using the radio frequency (RF) communication capabilities of the reader together via a special credential, NFC-based device, or via a communications port using infrared communications. Additional less-convenient methods may be employed such as wired communications which may require removal of the reader from the wall to connect the configuring device to the reader. These maintenance procedures may also require opening the reader enclosure or removing power from the reader and then restoring power to the reader.

As it is costly to send a technician to visit every reader in a system, this method of updating readers is avoided if at all possible. One of the primary advantages of this invention is that these operations can be performed—and performed securely—over the Wiegand wires thus avoiding a trip to the reader. Because the cost of performing a maintenance procedure at the card reader goes from very expensive to virtually nothing, the possibility of more frequent changes to the reader configuration and operating parameters becomes possible through the two-way packet mode communication provided by embodiments of the present invention. Moreover, remote updating of readers can be performed from anywhere in the world if there is Internet connectivity at the upstream device associated with the reader.

Another advantage offered by embodiments of the present invention is that the transmission of sensitive cardholder authentication information from the reader to the upstream devices, such as the 26-bit Wiegand format data discussed in the SIA standard, can be secured using proprietary as well as conventional and standardized security protocols that require two-way communications between the sender and the receiver. Bi-directional communications enables the ability to utilize mutual authentication, a well established mechanism commonly used to authenticate communication devices.

The present invention is generally directed toward a method, apparatus, and system that provide the additional security features described above to unidirectional security protocols. Although well suited for use in a physical access control system utilizing the Wiegand protocol, embodiments of the present invention may be suitable for use in any system utilizing a unidirectional protocol.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

DETAILED DESCRIPTION

Figure 1:
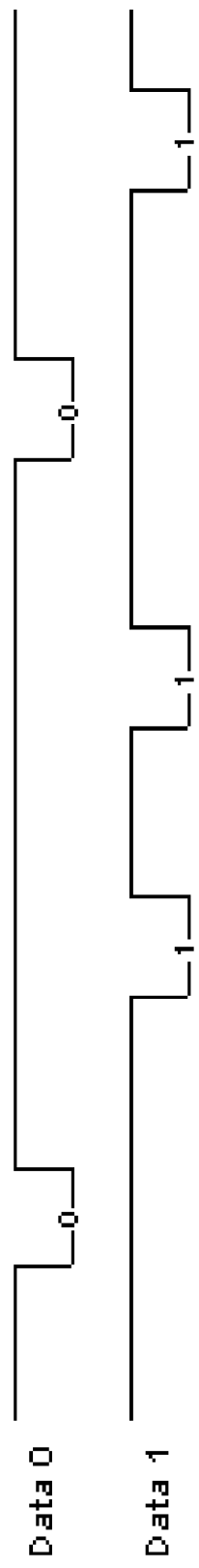
FIG. 1 is a waveform diagram for transmitting binary data over Wiegand wires in accordance with embodiments of the present invention.
Figure 2:
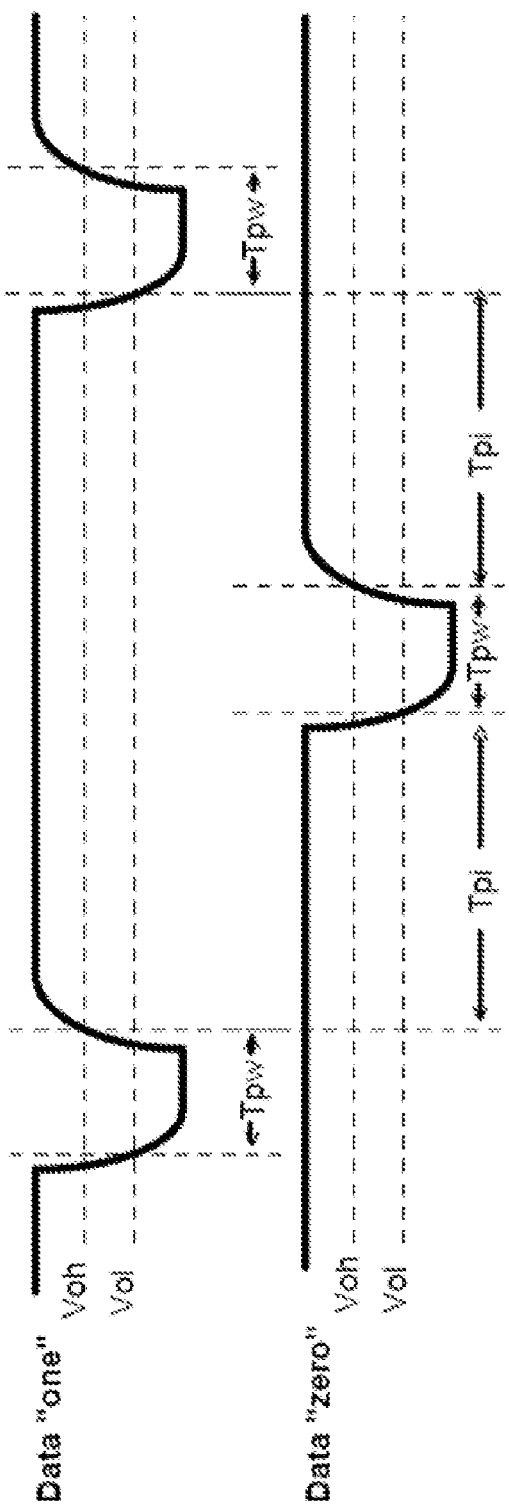
FIG. 2 is a waveform diagram for timing characteristics of Wiegand data transmitted in accordance with embodiments of the present invention and as described in the SIA Standard.
Figure 3:
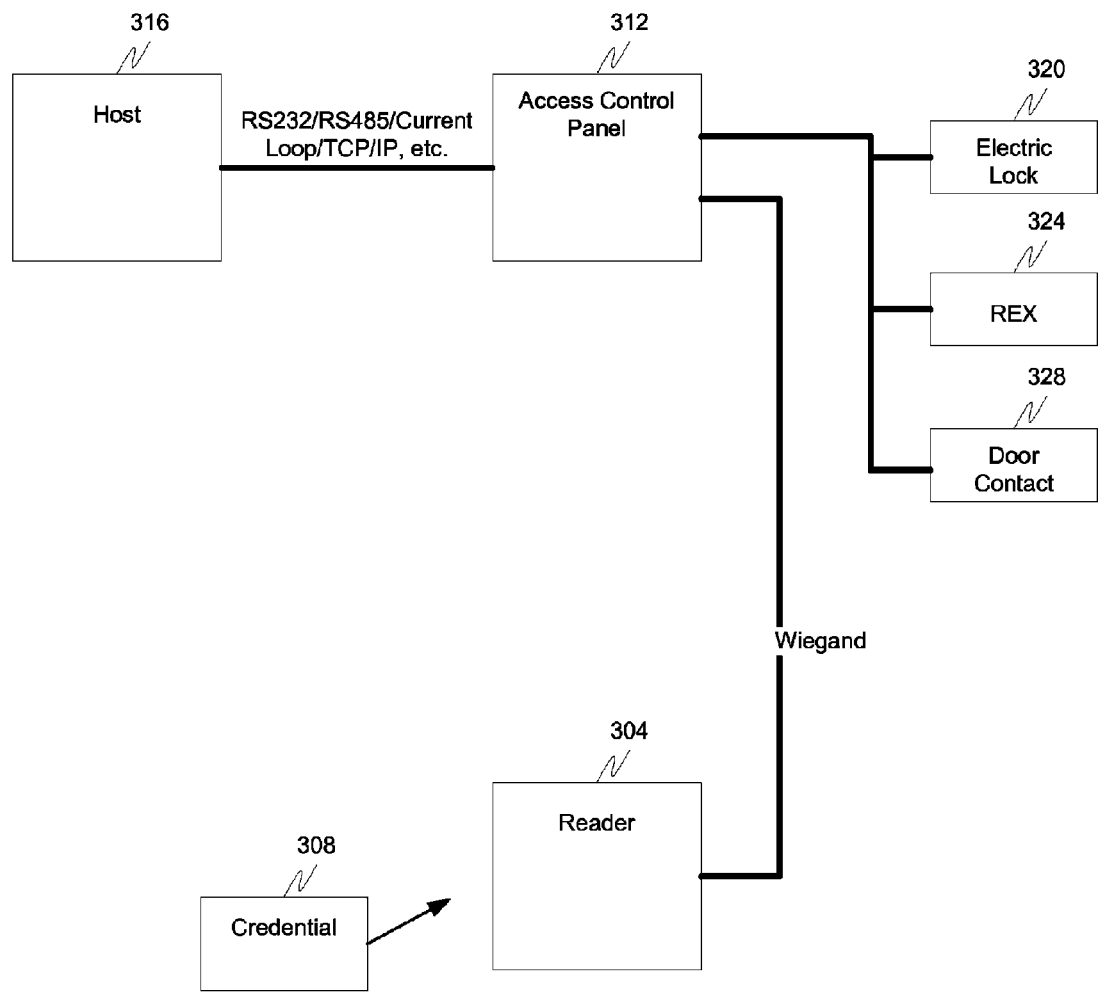
FIG. 3 is a block diagram depicting a communication system in accordance with embodiments of the present invention.

The present invention is generally directed toward a communication method, device, and system. Embodiments of the present invention address deficiencies of the prior art and may be utilized within the context of physical access control or security systems, as well as be equally efficiently utilized in a broad range of other applications that use a unidirectional communications protocol.

One compelling aspect of the present invention is that it yields so many benefits without dramatically altering the Wiegand protocol. Not only are existing deployed hardware and wiring unchanged but the size and therefore the transmission properties of the message are not significantly changed.

Obscuring Wiegand Data

There are in the art many rolling code generators. Rolling code generators are also known as pseudo-random number generators (PRNG). A rolling code generator is a function, algorithm or procedure that creates the next elements in a sequence of numbers given one or more of the previous elements together with some ancillary information such as the indices in the sequence of the elements being used.

For example, the rolling code algorithm $$x_{i+1}=(1+x_i+2(g(x_i+1)-g(x_i)\bmod 2^n))$$

where $$g(x)=x \oplus 2x+1$$

shows how to generate the next element, $x_{i+1}$, in a sequence given the current element, $x_i$. ($\oplus$ is the logical XOR or exclusive OR operation.) Such a procedure is given an initial value, $x_0$, to initiate the generation.

For use in a preferred embodiment in the context of this disclosure, the rolling code generator should be what is known in the art as cryptographically strong. There are in the art alternative definitions of cryptographically strong but to a first approximation it means that: 1) many elements are generated before the sequence starts to repeat, 2) each possible number that the generator can generate appears as often as other numbers that the generator can generate, and 3) the minimum number of distinct values in contiguous subsequences is large.

All of these criteria and others describing cryptographically strong rolling code generators can be given strict mathematical definitions and rolling code generators satisfying these definitions can be constructed.

Which particular cryptographically strong rolling code generator is used in a particular embodiment of the invention depends on the security context in which the embodiment is to be used and on the resources available for the embodiment's implementation.

In accordance with at least some embodiments of the present invention, the rolling code generator may provide a sequence of numbers. In one embodiment of the data obfuscation, each number may be represented in binary notation; i.e., to the base 2, with a fixed number of digits (i.e., length). If, for example, the fixed number of binary digits were 6, then the number 3 would be represented by 000011. Thus, the obfuscated message produced by the rolling code generator is the same length as the original message and it yields a fixed-length sequence of 0's and 1's.

The message from the reader to the upstream device may also be a fixed-length sequence of 0's and 1's, called a format. Said format comprises a number of data fields including the unique identification of the card presented to the reader, the location of the reader, a unique identification of the reader, etc.

The contribution of the data obfuscation portion to embodiments of the present invention is to combine the 0's and 1's produced by the rolling code generator with the 0's and 1's of the format to be sent from the reader to the upstream device in such a way that the upstream device, with knowledge of the rolling code, can recover the original, un-combined format data but an attacker only in possession of the combination of rolling code and format data cannot recover the original, uncombined format data.

There are in the art many ways of performing this combination. Many of these means are known in the art as stream ciphers. In one embodiment, the rolling code generator is configured to generate a string of 0's and 1's that was exactly as long as the format data and the two binary strings are combined using the logical exclusive OR operation (XOR).

As with rolling code generators, combination mechanisms can be used in a particular embodiment of the invention. The combination used may depend on the security context in which the embodiment is to be used and on the resources available for the embodiment's implementation.

Two-Way Packet-Mode Communication

Possible System Configurations

Figure 4:
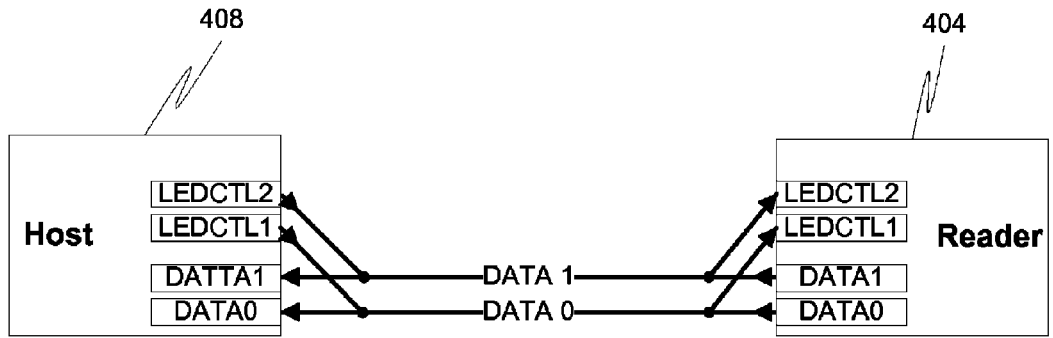
FIG. 4 is a block diagram depicting a half-duplex configuration of a reader and host in accordance with at least some embodiments of the present invention.
Figure 5:
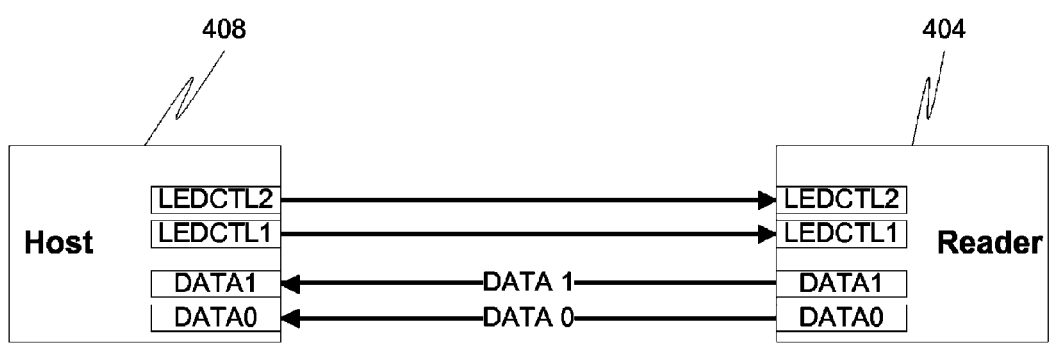
FIG. 5 is a block diagram depicting a full-duplex configuration of a reader and host in accordance with at least some embodiments of the present invention.

In accordance with at least some embodiments of the present invention, two-way communications between a reader and an upstream device may be facilitated utilizing existing Wiegand wires that currently connect the reader with the upstream device and have been previously used to facilitate unidirectional communications from the reader to the upstream device. One aspect of current Wiegand wires that can be exploited to facilitate two-way communications is the fact that Wiegand wires use open collector signals. This means that a reader or upstream device can either transmit messages on the Wiegand wire or receive messages being transmitted on the Wiegand wire even though the SIA standard only describes data transmission from the reader to the upstream device. As can be seen in FIGS. 4 and 5, two types of system configurations can be utilized to facilitate bidirectional data communications using Wiegand wires, namely a half-duplex configuration (FIG. 4) and a full-duplex configuration (FIG. 5).

In the full-duplex system configuration, 4 wires may be used to connect the reader to the upstream device. Two of the wires may be utilized to carry data communications from the reader to the host as per the Wiegand standard. These wires correspond to the DATA0 and/or DATA1 lines, which carry DATA0 and/or DATA1 signals, respectively. In the simplest method, two of the Wiegand signaling wires can be utilized to carry data communications from the host to the reader in the same method that is defined in the Wiegand standard. These wires may correspond to the LEDCTL signal lines, a buzzer signal line, a hold/inhibit signal, or the like. In another embodiment, these wires may be used to conduct bi-directional communications using level-based communications or modulation-based communications (e.g., asynchronous serial data, FSK, PSK, ASK, etc.). In the full-duplex configuration, both the reader and host may be enabled to simultaneously send messages to the other device without incurring message collision problems In a half-duplex configuration, however, unless the reader and the upstream device use a mechanism preventing them from trying to communicate with each other at the same time, message collisions resulting in data alteration may occur since the communication lines (e.g., DATA0 and DATA1) between the reader and host are shared and used to support bi-directional message traffic. By nature, Wiegand communications are relatively low volume traffic and collisions will be rare. However, since there is still a statistical probability that message collisions can occur, embodiments of the present invention provide a number of different ways to enable half-duplex communications while also accounting for possible message collisions.

In accordance with at least one embodiment of the present invention, both the reader and upstream device may be enabled to send messages to the other device at any time. When a collision is detected (e.g., because a corrupted or unrecognizable message has been received) then a predefined protocol may be followed whereby, for example, the reader re-transmits its message within 5 seconds of detecting the collision and then the host transmits its message between 5 and 10 seconds after detecting the collision. In an alternative re-transmission scenario, both the reader and upstream device wait a random amount of time and retry their transmission. Collisions may be detected by any type of known error checking and correcting algorithm. If the messages contain error correction data and the message can be reliably constructed without resorting to a retransmission, then the other sender will be able to retransmit, if necessary, without the possibility of a resultant second collision.

In a preferred embodiment, the reader and upstream device operate in predefined sending and listening modes and only change their sending/listening mode upon the occurrence of a predefined event. As one example, the reader may be in a default send mode and the upstream device may be in a default listen mode. Each device may maintain its respective default mode until a predetermined event occurs (e.g., a card is presented to the reader, read by the reader, and/or card data is sent to the upstream device). When the event does occur, the devices may switch to the alternative mode such that the reader goes into a listen mode and the upstream device goes into a sending mode for a predetermined amount of time after the occurrence of the event. During this window of time, the upstream device may be free to send any necessary messages to the reader since the reader is in listen mode and is otherwise prohibited from sending messages. By having synchronized, alternating, and mutually exclusive operating modes, collisions on the Wiegand wires are avoided.

Another type of predetermined event that may initiate a change in listening/sending modes of the upstream device and reader may be the transmission of a heart beat message from the reader to the upstream device via the LEDCTL signal or other method. As discussed herein, the heart beat message transmitted from the reader to the upstream device is essentially an empty Wiegand message (because it does not actually contain card data) that is utilized to allow the reader to check-in with the upstream device. Of course, in accordance with at least some embodiments of the present invention, the heart beat message may contain a rolling code to verify the identity of the reader to the upstream device. The heart beat messages are essentially used by the reader to prove to the upstream device that it is still alive and functioning as well as insuring that the communications wires are intact and that the reader has operating power. Each time a heart beat message is transmitted from the reader to the upstream device, the devices may alternate sending and listening roles for a predetermined amount of time after the occurrence of the event. However, if the periodicity with which heart beat messages are transmitted is relatively fast such that the upstream device wouldn't be able to send a message to the reader between heart beat messages, then the operating modes of the devices may only be switched after every other, every third, every fourth, etc. heart beat message. The parameters used to define when the devices switch listening and sending roles may vary depending upon other system characteristics and should not be limited to the examples discussed herein.

Although the half-duplex configuration depicted above shows the connection of the LED control signals to the DATA lines as being external to the host and reader, one skilled in the art will appreciate that these connections may also be made internally within the host and/or reader. More specifically, internal connections between the LED modules in the host and/or reader may be made to the DATA0 and/or DATA1 modules in the host and/or reader.

Mode Change Protocol

In the teachings of the current disclosure, communications between the reader and upstream systems is modal. Embodiments of the present invention contemplate at least two modes of communication. One mode is the communication of the current art according to the SIA standard. The other mode is the advanced two-way packet-mode of communication described herein. In another embodiment, one mode is the standard Wiegand communication mode and the other mode is the secure Wiegand mode.

Modal communication necessitates a method of changing from one mode to the other and then optionally back to the original mode. In the teachings of the current disclosure, either the card reader or the upstream device can initiate mode change from Wiegand-format mode to packet-mode or from legacy Wiegand mode to secure Wiegand mode (i.e., the secure use of rolling codes in accordance with the Wiegand mode).

Upstream Device-Initiated Mode Change

It is desirable for communications to occur using the inventions described herein. Since a mix of readers that both support and do not support the inventions described herein may be present, the upstream device can use the out-of-band communications channel in which the timing characteristics are changed to detect which readers support the inventions described herein. Any such reader can be directed by the upstream device to switch to these improved methods using the following methods. Note that this is very desirable because it allows a manufacturer to sell a single reader that support both legacy communications and these new communications methods and the improved methods will automatically be turned on by upstream devices that also support these improved communication methods.

As described in the SIA standard, the LEDCTL signal can be in one of two states, high or low. Each state of the LEDCTL signal is associated with the state of the illumination of an LED on the card reader. This illumination is intended to provide information about the state of the physical access control system to a human being presenting a card to the reader. Thus the state of the LEDCTL signal as currently defined in the standard and used for purpose in the field must be constant long enough to be supraliminally acquired by a human observer. Supraliminal visual acquisition time in humans is determined by many factors such as the nature of the symbol and the age of the human but the psychophysical literature generally agrees that presentation times below 10 ms may be subliminal or not perceived at all.

As the visual presentation controlled by LEDCTL is not intended to be subliminal, if the state of the LEDCTL is constant for less than 10 ms a reader implementing the means and methods of the current disclosure on the LEDCTL Wiegand wire can safely conclude that this is the beginning of the protocol to switch to the packet-mode of communication on LEDCTL and not a signal to change the state of the illumination of the LED. Additionally, data may be sent to the reader in a secure fashion (i.e., through obfuscation with a rolling code) within the 10 ms window.

Conversely, if the reader does not implement the means and methods of the current disclosure on the LEDCTL Wiegand wire, presentation of a voltage level on the LEDCTL line of less than 10 ms by the upstream device will either be ignored by the reader or will cause the illumination of an LED to change beneath the threshold of conscious awareness of the cardholder and therefore will not alter the understanding of the cardholder in the state of the access control system.

Thus, by the means and methods of the current disclosure, the addition of readers or upstream devices to existing physical access control systems is completely backward compatible with existing system components. A reader implementing the teachings of this disclosure will behave exactly as a reader of the current art when used with an upstream device of the current art with respect to the signals on the LEDCTL wire. The upstream device of the current art will send LEDCTL signals, levels, and/or communication data with stable times of greater than 10 ms and the reader implementing the teachings of this disclosure will interpret these to be commands for changes in the illumination of an LED. Conversely, an upstream device implementing the teachings of the current disclosure sending a level change on the LEDCTL wire of less than 10 ms of duration indicating a request to transition to digital data transition mode will not receive a reply from a reader in the current art and therefore will henceforth treat the reader as a reader of the current art.

In order to support the means and methods of the current disclosure, the software in a reader will not change the state of the LED immediately upon receipt of a change in the LEDCTL voltage level. Rather, upon detection of change in LEDCTL, the reader software/firmware will sample the LEDCTL line approximately 10 ms later. If the voltage is still at the new level, then this is an indication from the upstream device to change the state of illumination of the LED. If the voltage has returned to the value before the detected change then this is an indication from the upstream device to switch to the digital transmission mode. In telecommunications art, the 10 ms signal is called a START signal.

A reader implementing the teachings of the current disclosure having detected a voltage level duration on the LEDCTL wire of less than 10 ms sends an acknowledgement message, which may be obfuscated with a rolling code, on the DATA0 and DATA1 wires indicating that it has detected the request to change to packet-mode communication on the LEDCTL wire and has switched to this mode of reception on the LEDCTL wire.

The change back to the interpretation of signals on the LEDCTL described in the SIA standard by either the reader or the upstream device is accomplished either by sending a message in packet-mode to terminate packet-mode communication. Furthermore, once the reader is in a secure Wiegand mode (i.e., a packet transmission mode or any other secure Wiegand mode discussed herein), the reader and/or upstream device will set a flag that indicates the change to the secure Wiegand mode has been executed. In accordance with at least some embodiments of the present invention, when the reader powers up, the reader stays in this mode so that a power cycle, for example, cannot be used to attack the reader and send it back to an unsecured mode of operation. While there may be some secure way of causing a reader to go back to its initial mode of operation (i.e., resetting the flag), it should not be due to a power down of the reader, which could be easily exploited by an attacker to compromise the system.

Reader-Initiated Mode Change

The DATA0/DATA1 channel from the reader to the upstream device carries digital data according to existing standards and usage so, unlike the panel-to-reader channel, it is not necessary to configure the channel for the transmission of digital data. There are circumstances however wherein which it is advantageous for the reader to signal a switch from the Wiegand format of described in the SIA standard to a more flexible packet format such as the datagrams of the Internet Protocol (IP).

This is accomplished by sending a special format message, for example a message consisting of all 1's. Such a message may be referred to as a STOP signal. The upstream device would acknowledge the change to packet mode by sending the upstream device-initiated packet-mode START signal as above.

In accordance with at least some embodiments of the present invention, the host may detect when a message has been received to determine that the line is secure. Once a message is received at the host, the host may initiate a mode change by sending a mode-change message to the reader.

Data Encoding

There are in the current art methods of encoding sequences of 0's and 1's or digital data bits on a single wire such as LEDCTL. There are also in the current art methods of forming these streams into finite-length blocks of 8-bit elements called bytes.

The blocks of digital data received on the LEDCTL wire are called frames. In the interest of simplicity and ease of implementation, a preferred embodiment would employ frames consisting of constant and fixed number of bytes in every block of data; i.e. a fixed frame length.

In the case that software/firmware in the upstream device is used to interpret the encoding of the digital data on the LEDCTL wire (a software UART), it is advantageous that the frames be short because the reader will have to devote all of its resources to this task for example by turning off interrupts and thus will not be in a mode to receive signals on its other inputs, for example on the input that reads cards presented to it.

For the purposes envisioned for packet-mode communication using the LEDCTL line, message lengths on the order of 8 to 16 bytes are deemed sufficient. If error detection and correction (packet framing below) posed a 100% overhead, then a frame length of 32 bytes would be required. Assuming a transmission rate of 200k bits/second, such a frame would take the reader off-line for approximately ½ of a millisecond. With a hardware UART, there is essentially no off-line time.

In alternative embodiments of the current disclosure, frames are of variable length and the data encoding methodology includes the determination of the number of bytes in the frame, message length, symbols, etc.

Packet Framing

A frame is an undifferentiated finite sequence of bytes. In order to turn the frame into a message, the values of the bytes need to be given meaning. Imputing meaning to the bytes in a frame is called packet framing and results in a packet of data. Both the upstream device and the card reader have to agree on the semantics of the bytes in the frame for a packet to be formed and for packet-mode communication to take place.

In one embodiment of the current disclosure, there is a single, fixed agreement within the access control system as to the structure of a packet of data on the LEDCTL wire. In an alternative embodiment, the only fixed aspect of the structure of the packet is an indication of what type of packet is to be found in the frame. This could, for example, be the first byte in the frame wherein the value of this byte indicates the type of packet encoded in the following bytes.

In the case that a fixed frame length is used, the packet length may be different than the frame length, in particular the packet length may be less than the frame length. In this case the packet has to be found within the frame. One method of doing this is to reserve specific byte values to mark the beginning and end of the packet. The SLIP protocol is a method of packet framing using special byte values.

There are in the art other packet framing protocols that would be appropriate for use on two-way, packet-mode serial communication means for Wiegand wires described in the current disclosure such as the serial line internet protocol (SLIP) described in RFC 1055 and the point-to-point protocol (PPP) described in RFC 1661.

In a preferred embodiment of the current disclosure, packet framing also includes error checking and error correction using means and methods of the current art such as cyclic redundancy codes (CRC) and Hamming encoding.

Serial Line Internet Protocol (SLIP)

The following code excerpted from RFC 1055 implements a small and efficient packet framing protocol called SLIP. Due to the short frames envisioned in the application of the current disclosure, no flow control is needed or defined. SLIP can be used effectively with Van Jacobsen TCP header compression when the IP datagrams are carrying TCP packets (See IP over Wiegand below).

```
/* SLIP special character codes
 */
#define END        0300   /* indicates end of packet */
#define ESC        0333   /* indicates byte stuffing */
#define ESC_END    0334   /* ESC ESC_END means END data byte */
#define ESC_ESC    0335   /* ESC ESC_ESC means ESC data byte */
/* SEND_PACKET: sends a packet of length "len", starting at
 * location "p".
 */
void send_packet(p, len)
    char *p;
    int len; {
    /* send an initial END character to flush out any data that may
     * have accumulated in the receiver due to line noise
     */
    send_char(END);
    /* for each byte in the packet, send the appropriate character
     * sequence
     */
    while(len--) {
        switch(*p) {
        /* if it's the same code as an END character, we send a
         * special two character code so as not to make the
         * receiver think we sent an END
         */
        case END:
            send_char(ESC);
            send_char(ESC_END);
            break;
```

```
            /* if it's the same code as an ESC character,
             * we send a special two character code so as not
             * to make the receiver think we sent an ESC
             */
            case ESC:
                send_char(ESC);
                send_char(ESC_ESC);
                break;
            /* otherwise, we just send the character
             */
            default:
                send_char(*p);
            }
            p++;
        }
    /* tell the receiver that we're done sending the packet
     */
    send_char(END);
    }
/* RECV_PACKET: receives a packet into the buffer located at "p".
 *    If more than len bytes are received, the packet will
 *    be truncated.
 *    Returns the number of bytes stored in the buffer.
 <*/
int recv_packet(p, len)
    char *p;
    int len; {
    char c;
    int received = 0;
    /* sit in a loop reading bytes until we put together
     * a whole packet.
     * Make sure not to copy them into the packet if we
     * run out of room.
     */
    while(1) {
        /* get a character to process
         */
        c = recv_char( );
        /* handle bytestuffing if necessary
         */
        switch(c) {
        /* if it's an END character then we're done with
         * the packet
         */
        case END:
            /* a minor optimization: if there is no
             * data in the packet, ignore it. This is
             * meant to avoid bothering IP with all
             * the empty packets generated by the
             * duplicate END characters which are in
             * turn sent to try to detect line noise.
             */
            if(received)
                return received;
            else
                break;
        /* if it's the same code as an ESC character, wait
         * and get another character and then figure out
         * what to store in the packet based on that.
         */
        case ESC:
            c = recv_char( );
            /* if "c" is not one of these two, then we
             * have a protocol violation. The best bet
             * seems to be to leave the byte alone and
             * just stuff it into the packet
             */
            switch(c) {
            case ESC_END:
                c = END;
                break;
            case ESC_ESC:
                c = ESC;
                break;
            }
            /* here we fall into the default handler and let
             * it store the character for us
             */
        default:
            if(received < len)
                p[received++] = c;
        }
    }
}
```

IP Over Wiegand

In order to support Internet transport and network protocols such as TCP and UDP and application Internet protocols such as HTTP and SNMP, embodiments of the present invention may utilize an IP packet called IP-over-Wiegand.

Arbitrary protocols including proprietary protocols and industry-specific protocols can be carried in IP packets. Those familiar with the art of digital data communication will understand that the means and methods of the current disclosure include the transmission of packets that are not Internet packets but may designed explicitly for use in physical access control systems.

The intent of the current disclosure is to cover all methods for the serial communication of digital data on the LEDCTL line in conformance to three constraints.

The first constraint is that there be no changes to the existing hardware comprising either the physical access control reader or the upstream device communicating with the reader.

The second constraint is that components implementing the means and methods of the disclosure are in full compliance with the SIA standard.

The third constraint is that card readers and upstream devices such as control upstream devices that implement the teachings of the current disclosure interoperate seamlessly with card readers and upstream devices complying with the SIA standard that do not implement the teachings of the current disclosure.

By adding hardware to either the card reader or the upstream device or by inserting additional hardware components such as gateways and translators into the physical access control system, there are alternative methods of achieving the communication of packet data from upstream devices to card readers using Wiegand wires. Indeed there are such devices in the art.

The advantage provided by embodiments of the present invention is that two-way, packet-mode communication can be achieved on existing hardware and thus without adding hardware components to the physical access control system and without changing existing hardware or wiring in the physical access control system.

The commonly accepted and widely held view of the physical access control industry is that the Wiegand protocol described in and constrained by the SIA standard can achieve the communication of digital data in only one direction, namely from the reader to the upstream device. By describing the communication of digital data in the other direction, from the upstream device to the reader, and by defining communication between the card reader and the upstream device while maintaining conformance to the SIA standard and on existing hardware, embodiments of the present invention connect the end nodes of physical access control systems to the Internet and thereby drastically decrease their maintenance and administration costs and greatly increase their security. Additionally, a party line may be provided to detect collisions if the readers and/or upstream device are operating in a packet mode. Thus, multiple readers can be connected to the upstream device via a single wire and the communication time on that wire may be shared among the readers.

Blind Synchronization

In accordance with at least some embodiments of the present invention, two devices may be using a synchronized PRNG to, for example, secure the communication between them. Synchronization of the PRNG between the two devices can be lost if any number of disruptions occur at either the reader or upstream device or any intermediary device. By utilizing at least one embodiment of the present invention, the two devices can regain synchronization of the pseudo-random number sequence without opening the possibility of a replay attack on the pseudo-random number sequence.

The PRNG used to secure the communication between them is used every time they communicate and therefore is called the "fast" PRNG. The other PRNG is only used when the devices need to resynchronize the fast PRN. This second PRNG is called the "slow" PRNG.

In the current art, an element generated fast PRNG or some function of an element generated by the fast PRNG is used to resynchronize the PRNG. An attacker listening on the communication line between the two devices can capture and replay the resynchronization sequence. Thus, and in accordance with at least some embodiments of the present invention, when the fast PRNG needs to be resynchronized, the slow PRNG is stepped to the next value. This next element of the slow PRNG shared by the two devices may be used to restart the fast PRNG from some predetermined beginning point, for example the element of the slow PRNG itself or some function thereof.

Data Transfer Reduction

In accordance with at least some embodiments of the present invention, a method and system for reducing the amount of data transferred from a reader to an upstream device is provided. Although the following method will be described in relation to the transmission of Wiegand format data, one skilled in the art will appreciate that the inventive data transmission methods described herein can be applied to other types of data transmission and security protocols.

The specific formatting of card data may have certain redundancies from card to card. For example, many cards distributed at a common location or site may be assigned the same site code. While each card has a unique card code, the site code is common among a plurality of cards used at a particular site. However, according to the SIA standard, the upstream device typically analyzes both the site code and card code transmitted from a reader (which was obtained from a card presented thereto). Accordingly, it is typically required that a reader transmit both the site code and card code to the upstream device so that the identity of the card presented to the reader can be determined.

In accordance with at least some embodiments of the present invention, the data redundancies between cards within a card population is identified and used to reduce the amount of data transmitted from the reader to the upstream device. An exemplary method of reducing data transmissions between the reader and upstream device will be described in accordance with data structures depicted in FIG. 6.

According to the SIA standard for 26-Bit Wiegand, the first bit is an even parity for the following 12 bits. Bits 2-9 are the site code and bits 10-25 are the card number. The final bit (i.e., bit 26) is an odd parity over the previous 12 bits. Accordingly, the 26-bit Wiegand standard comprises at least two data fields (i.e., a site code and card number data field). Data from common data fields of different cards may be identical, for example if both cards are issued the same site code or if the same card is presented to the same reader at two different times.

Figure 6:
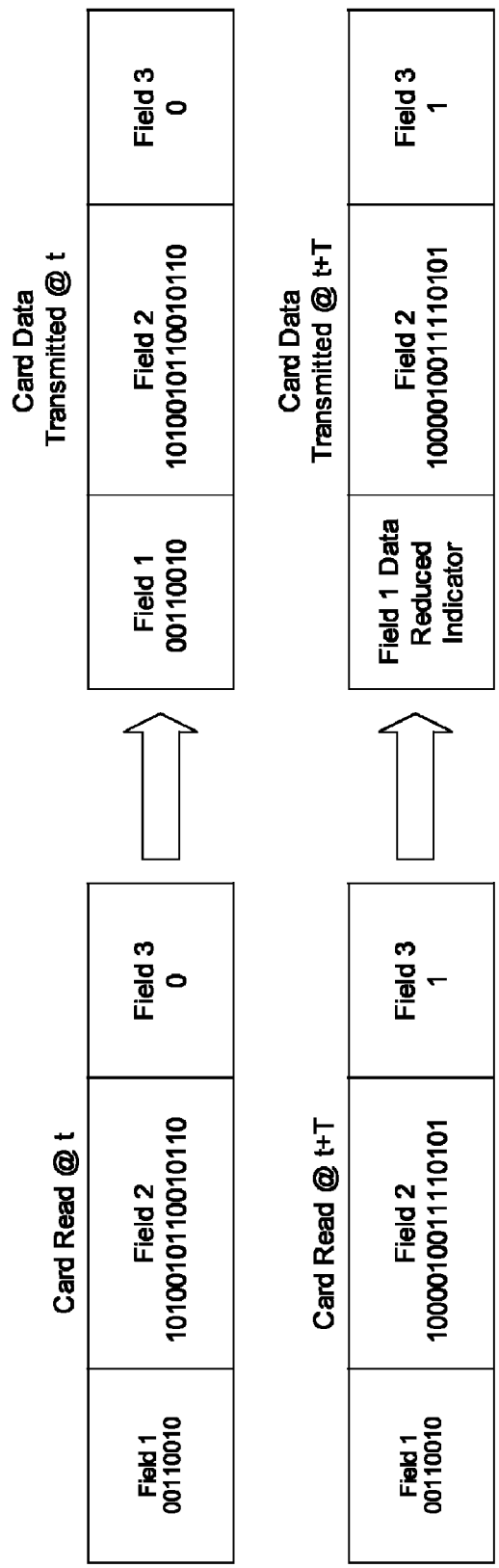
FIG. 6 is a block diagram depicting one or more data structures used in accordance with at least some embodiments of the present invention.

As can be seen in FIG. 6, when a site code or other data field is redundant between two cards, there may be an opportunity to reduce the amount of data transmitted from the reader to the upstream device. More specifically, if the reader and upstream device can maintain a synchronized accounting of the cards that have been previously presented to the reader and had their entire data set transmitted to the upstream device, then the reader may be enabled to replace data from an entire field with an indicator which indicates that the omitted data from a particular field is redundant with a previously presented card. Upon recognizing the indicator, the upstream device can reference its cache to find the redundant data from a data field of a previously presented card. Thus, instead of sending a plurality of bits of data (e.g., 8 bits for the site code), the reader is enabled to send an indicator, which will be comprised of data that cannot ordinarily appear in the message. Alternatively, other methods of detecting that a field has been compressed can be employed such as the message receiver noting that the fixed length message is shorter or even including an additional field comprised of single bits indicating whether or not a field is present or has been reduced. This allows the reader to reduce the amount of data transmitted when a card currently presented to a reader comprises a field of data that matches a field of data from a previously read card.

In another more aggressive scheme, reduction of data can be utilized within a field. For example, if the card number field is 16 bits but only cards 1 through 100 are actually in use, the card number field will always have many high-order zero bits that can be reduced.

In accordance with at least some embodiments of the present invention, the reader may be required by internal logic to at least send certain portions of the card data regardless of whether or not it is found in its cache. For example, if the reader reads the same card two times in a row, the reader may still be required to send at least the card number. Without such a requirement an attacker could send illicit indicators to the upstream device for all data fields that should be transmitted by the reader after the reader had previously sent valid card data. Upon receiving all of the indicators, the upstream device would simply refer to the previously read card data and allow the attacker access to the asset. Of course, the use of security techniques, some of which are described herein, in connection with the indicators would help to alleviate the risk of improperly allowing entry to an attacker that simply transmits indicators to the upstream device.

As can be appreciated by one skilled in the art, this may work for many different types of data organizational schemes used, for example, in Wiegand data transmissions. For instance, embodiments of the present invention may be utilized to reduce the amount of data transmitted in a 26-bit Wiegand data transmission scheme where three data fields (i.e., site code, card code, and parity bits) are typically transmitted from the reader to the upstream device. Alternatively, embodiments of the present invention may also be utilized in data transmission schemes that utilize significantly more data fields, such as PIV and other evolving standards, where a relatively large amount of data is transmitted from a reader to an upstream device when a card has been read by the reader. Any logical separation of data may be used to determine whether fields have been previously submitted from the reader to the upstream device In accordance with at least some embodiments of the present invention, the reader may compare data fields of a currently read card with data fields of a card that was read immediately before the currently read card. For example, the reader may comprise a cache for only one set of card data at a time. Thus, only a single comparison between the data fields of the currently read card and data fields of the previously read card needs to be performed. Alternatively, the reader may comprise a list of cards that have been previously read along with an order identifier (e.g., last read card, second-to-last read card, third-to-last read card, etc.). Data fields of a currently read card may be compared to data fields from all of the other cards that are maintained in the reader's cache. A comparison may be performed for each card in the cache until a match between fields has been identified.

While utilization of multiple comparisons does increase the amount of processing required by the reader, it may further reduce the amount of data that is transmitted to the upstream device, thereby decreasing the overall traffic on the system. When the reader contains the records of multiple previously read cards and data from a currently read card is not being sent since it matched at least some data in one of the previously read cards, the reader may also need to include in its transmission of card data the identifier of the card from which the match was found. Accordingly, the upstream device should maintain a cache that is substantially consistent and synchronized with the cache of the reader.

In the event that a data transmission error occurs (e.g., because of a network failure, because of a power outage at the upstream device, etc.), and the reader attempts to transmit less than all of the data from a currently read card (because the reader determined that at least some of the data matched data from a previously read card), the upstream device may no longer be synchronized with the reader and the instant data transmission may be determined to be erroneous by the upstream device. If such a situation occurs, the upstream device may communicate to the reader using any of the methods described herein that it did not recognize the partial transmission and/or could not find the matching field to replace the non-transmitted field. This communication may be in the form of an error message. Alternatively, the upstream device may transmit a re-send entire data message to the reader. Upon receiving such a message from the upstream device, the reader may re-transmit all of the data from the currently read card. As an alternative reaction, the reader may clear its cache upon receiving such a message, request a re-read of the card, and transmit the entire card data. Either reader reaction will allow both the reader and upstream device to re-synchronize with one another as well as allow the upstream device to fully analyze the card data.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and†or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A communication method, comprising:
obfuscating data transmitted in a first message from a first communication device to a second communication device, wherein the first and second communication devices communicate using a unidirectional communication protocol and wherein the obfuscation of the data is effected with a predetermined code wherein the first communication device is upstream of the second communication device, the method further comprising:
determining that the message received at the first communication device was transmitted by the second communication device, wherein determining is performed by one or more of (i) analyzing an out-of-band communication received at the first communication device from the second communication device and (ii) analyzing a special code that identifies the second communication device is advanced communication device in an advanced communication mode; and
based on determining that the message was transmitted by the second communication device, transition the first communication device from a first mode of operation to a second mode of operation, wherein the first mode comprises a Wiegand-format mode and the second mode comprises a packet-mode.

2. The method of claim 1, wherein the predetermined code is agreed upon between the first and second communication devices prior to obfuscation of the data in the first message.

3. The method of claim 1, wherein the predetermined code is one of a plurality of codes within a rolling code sequence, wherein the first and second communication devices each have a copy of the rolling code sequence and wherein data communicated between the first and second communication devices subsequent to the first message is obfuscated with a code from the rolling code sequence that is different from the predetermined code.

4. The method of claim 1, wherein the unidirectional communication protocol comprises the Wiegand protocol.

5. The method of claim 4, wherein the first message comprises a Wiegand message.

6. The method of claim 5, wherein the Wiegand message is encapsulated in one of a TCP and UDP packet and is transmitted over an IP network from the first communication device to the second communication device.

7. The method of claim 1, wherein obfuscation comprises computing an XOR of the predetermined code and the data.

8. The method of claim 1, wherein the predetermined code is employed to identify an authenticity of the first communication device and a timestamp.

9. The method of claim 1, wherein the message transmitted by the second communication device comprises an alteration of a control line signal between the first and second communication devices for a predetermined amount of time.

10. The method of claim 9, wherein the predetermined amount of time is less than 10 ms.

11. The method of claim 1, wherein the message was transmitted over a Wiegand wire.

12. The method of claim 11, wherein the message was transmitted over an LEDCTL line of the Wiegand wire.

13. The method of claim 1, further comprising:
   detecting a message collision on a communication path between the first and second communication devices; and
   initiating a cooperative transmission of messages over the communication path such that the first communication device transmits a message to the second communication device over the communication path at a different time than the second communication device transmits a message to the first communication device over the communication path.

14. The method of claim 1, wherein out-of-band communications are transmitted from the second communication device to the first communication device at a timing different from message timing used in the unidirectional protocol.

15. The method of claim 1, wherein control signals are used to accommodate bi-directional communications in one of a half-duplex configuration and a full-duplex configuration.

16. The method of claim 1, wherein the obfuscation is accomplished by the use of a stream cipher.

17. The method of claim 1, wherein the first message maintains the same size before and after being obfuscated.

18. A reader, comprising:
   at least one of a microprocessor or firmware;
   a rolling code generator operable to generate a plurality of distinct rolling codes; and
   a message formatting engine, wherein the message formatting engine is operable to retrieve a first rolling code from the rolling code generator and obfuscate data with the first rolling code prior to transmitting the data to an upstream device, wherein the reader is further operable to receive a message from the upstream device, determine that the received message received was transmitted by the upstream device, and based on determining that the message was transmitted by the upstream device, transition from operating in a first mode of operation to a second mode of operation, wherein the first mode comprises a Wiegand-format mode and the second mode comprises a packet-mode.

19. The reader of claim 18, wherein the upstream device also has a copy of the rolling codes, wherein data communicated to the upstream device after using the first rolling code is obfuscated with a code from the rolling code sequence that is different from the first rolling code.

20. The reader of claim 18, wherein a unidirectional communication protocol is used to facilitate communications between the reader and the upstream device, and wherein the unidirectional communication protocol comprises the Wiegand protocol.

21. The reader of claim 18, wherein obfuscation comprises computing an XOR of the first rolling code and the data.

22. The reader of claim 18, wherein the first rolling code is used to confirm an identity of the reader to the upstream device.

23. The reader of claim 18, wherein the message transmitted by the upstream device comprises an alteration of a control line signal between the reader and upstream device for a predetermined amount of time.

24. The reader of claim 23, wherein the predetermined amount of time is less than 10 ms.

25. The reader of claim 18, wherein the message is transmitted over a Wiegand wire.

26. The reader of claim 25, the message is transmitted over an LEDCTL line of the Wiegand wire.

27. The reader of claim 18, wherein the reader is further operable to detect a message collision on a shared communication path between the reader and upstream device and initiate a cooperative transmission of messages over the shared communication path with the upstream device.

* * * * *